(12) United States Patent
Nagao et al.

(10) Patent No.: US 7,927,503 B2
(45) Date of Patent: Apr. 19, 2011

(54) LUBRICANT FOR COMPRESSION TYPE REFRIGERATING MACHINE AND REFRIGERATING DEVICE USING SAME

(75) Inventors: Satoshi Nagao, Chiba (JP); Izumi Terada, Chiba (JP); Nobuaki Shimizu, Chiba (JP); Masato Kaneko, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 656 days.

(21) Appl. No.: 11/924,904

(22) Filed: Oct. 26, 2007

(65) Prior Publication Data
US 2009/0000331 A1    Jan. 1, 2009

Related U.S. Application Data

(63) Continuation-in-part of application No. PCT/JP2006/317666, filed on Sep. 6, 2006.

(30) Foreign Application Priority Data

Sep. 7, 2005    (JP) .................................. 2005-259882

(51) Int. Cl.
*C09K 5/04*    (2006.01)
(52) U.S. Cl. .......................................................... 252/68
(58) Field of Classification Search .................... 252/68
See application file for complete search history.

(56) References Cited

U.S. PATENT DOCUMENTS

| 5,399,631 | A | * | 3/1995 | Egawa et al. | ............... | 525/328.9 |
| 5,908,818 | A | * | 6/1999 | Egawa et al. | ................. | 508/579 |
| 6,734,151 | B1 | * | 5/2004 | Kubota et al. | | |

FOREIGN PATENT DOCUMENTS

| JP | 08-193196 | * | 7/1996 |
| JP | 10-46169 | | 2/1998 |
| JP | 10-088161 | * | 4/1998 |

OTHER PUBLICATIONS

U.S. Appl. No. 12/443,500, filed Mar. 30, 2009, Kaneko, et al.
U.S. Appl. No. 12/443,606, filed Mar. 30, 2009, Kaneko, et al.
U.S. Appl. No. 12/443,494, filed Mar. 30, 2009, Kaneko, et al.
U.S. Appl. No. 12/443,486, filed Mar. 30, 2009, Kaneko, et al.
U.S. Appl. No. 12/443,501, filed Mar. 30, 2009, Kaneko, et al.
U.S. Appl. No. 12/443,488, filed Mar. 30, 2009, Kaneko, et al.

* cited by examiner

*Primary Examiner* — John R Hardee
(74) *Attorney, Agent, or Firm* — Oblon, Spivak, McClelland, Maier & Neustadt, L.L.P.

(57) ABSTRACT

The present invention provides lubricating oil for a compression refrigerator, characterized by including an alkylene glycol or polyoxy alkylene glycol unit and a vinyl ether unit in a molecule and containing a polyvinyl ether compound having a molecular weight of 300 to 3,000. The lubricating oil for a compression refrigerator has a high viscosity index and excellent compatibility under a natural refrigerant atmosphere such as carbon dioxide.

17 Claims, 1 Drawing Sheet

LUBRICANT FOR COMPRESSION TYPE REFRIGERATING MACHINE AND REFRIGERATING DEVICE USING SAME

TECHNICAL FIELD

The present invention relates to a lubricating oil for a compression refrigerator, and more particularly to, a lubricating oil for a compression refrigerator using a natural refrigerant, and a refrigeration unit using the same.

BACKGROUND ART

Up to now, refrigerators such as those having a compression-refrigerating cycle of a compressor, a condenser, an expansion valve, and an evaporator use CFC (chlorofluorocarbon) and HCFC (hydrochlorofluorocarbon) as their refrigerants. In addition, many kinds of lubricating oil have been produced and employed in combination with such refrigerants. However, concerns are that the CFC compounds, which have been conventionally used as refrigerants, may destroy the ozone layer when the CFC compounds are discharged into the atmosphere and cause environmental pollution problems. In recent years, for measures against the environmental pollution, HFCs (hydrofluorocarbons), which may be alternatives for the CFC compounds, have been developed. A variety of so-called CFC substitutes including 1,1,1,2-tetrafluoroethane (R-134a) with a little fear of environmental pollution have become commercially available. However, concerns arise that the above-mentioned HFCs also cause environmental pollution problems. Thus, use of natural refrigerants without such problems and the like have been considered.

On the other hand, studies on carbon dioxide ($CO_2$), ammonia, and hydrocarbon gas have been made as natural refrigerants which substantially do not contribute to destruction of the ozone layer and global warming and will be provided as refrigerants in near feature.

For example, carbon dioxide ($CO_2$) is harmless for the environment and excellent from the viewpoint of safety for human, as well as having advantages of, for example, (i) its pressure almost at the optimal economical level; (ii) an extremely small pressure ratio, compared with that of the conventional refrigerant; (iii) an excellent adaptability to normal oil and structural materials of a machine; (iv) being available all over the place without any difficulty; and (v) extremely cheap price without the need of recovery. In addition, carbon dioxide ($CO_2$) has been used as refrigerants for some of the conventional refrigerators and the applications thereof as refrigerants for car air conditioners and heat pumps for hot water have been investigated in recent years.

Typically, for example, a compression refrigerator contains at least a compressor, a condenser, an expansion mechanism (e.g., an expansion valve), and an evaporator. Such lubricating oil for a compression refrigerator has a structure in which a liquid mixture of refrigerator oil, i.e., lubricating oil for refrigerant compressors and a refrigerant circulates in this closed system. In the compression refrigerator, although it depends on the kind of the apparatus, the inside of the compressor reaches a high temperature and the inside of the refrigerating chamber reaches a low temperature in general. Thus both the refrigerant and the lubricating oil should circulate in the system without causing phase separation within a wide temperature range from low to high temperatures.

In general, a temperature region in which the refrigerant and the lubricating oil are compatible, i.e., not phase-separated, is preferably in the ranges of −20° C. or less and 0° C. or more, more preferably in the range of 10° C. or more on the higher temperature range. If the phase separation occurs in the refrigerator at work, it will have a significantly adverse effect on the life or efficiency of the apparatus. For example, when the phase separation of the refrigerant and the lubricating oil occurs at a compressor part, it leads to insufficient lubrication in a moving part and causes burn out or the like, thereby significantly shortening the life of the apparatus. On the other hand, when the phase separation occurs in the evaporator, it leads to a decrease in heat exchange efficiency due to the presence of high viscous lubricating oil. The lubricating oil for a compression refrigerator is employed for lubricating the moving part of the refrigerator, so that its lubrication property is obviously considered to be also important.

In particular, the inside of the compressor becomes a high temperature, so it can be important for the lubricating oil to have a viscosity enough to retain an oil film to be required for lubrication. The required viscosity of lubricating oil varies depending on the kind of the compressor to be used and the use conditions thereof. In general, however, the viscosity (kinetic viscosity) of lubricating oil yet to be mixed with the refrigerant is preferably 1 to 50 $mm^2/s$, particularly preferably 5 to 20 $mm^2/s$ at 100° C. If the viscosity is lower than the defined value, a resulting oil film is thin and tends to cause insufficient lubrication. In contrast, if the viscosity is higher than the defined value, the heat exchange efficiency may be reduced. On the other hand, like a car air-conditioner, when it is designed for use in cold regions, the viscosity of lubricating oil should not be too high at low temperatures to ensure its ability of allowing the apparatus to be initiated. Therefore, the lubricating oil requires a lower pour point and a higher viscosity index. In general, the lubricating oil is required to have a pour point of −20° C., preferably −30° C. or less, more preferably −40° C. or less and a viscosity index of at least 80 or more, preferably 100 or more, more preferably 120 or more.

Further, the refrigerator oil requires various characteristics including lubricity and hydrolytic stability, as well as refrigerant compatibility and low-temperature fluidity. However, the characteristics of the refrigerator oil are easily affected by the kind of the refrigerant. When the refrigerator oil for a fluorocarbon refrigerant, which has been commonly used up to now is employed together with a natural refrigerant such as a carbon dioxide refrigerant, it is difficult to satisfy many characteristics that are required.

The development of novel refrigerator oil suitable for use with natural refrigerants, in particular, carbon-dioxide refrigerants, has been progressed. Polyalkylene glycol (PAG) has comparatively high compatibility to the carbon-dioxide refrigerant and is also excellent in low-temperature fluidity and hydrolytic stability, so it has drawn attention as one of substrates of refrigerator oil for carbon-dioxide refrigerants (see, for example, Patent Document 1).

The conventional PAG refrigerator oil described above shows compatibility to the carbon-dioxide refrigerator in a composition with a low proportion of the carbon-dioxide refrigerant, but the range of compatibility is not always sufficient. Therefore, there is a method for preparing PAG with low viscosity to provide such refrigerator oil with sufficient refrigerant compatibility. In this case, however, it tends to fall in a vicious cycle of being insufficient in lubricity and stability.

Patent Document 1: JP 10-46169 A

DISCLOSURE OF THE INVENTION

The present invention has been made under such circumstances and intends to provide lubricating oil for a compression refrigerator having good compatibility and a high viscosity index under atmosphere of a natural refrigerant, particularly carbon dioxide, and a refrigeration unit using such the lubricating oil.

As a result of intensive studies for developing lubricating oil for a compression refrigerator having preferable characteristics as described above, the inventors of the present invention have found that lubricating oil containing as a primary component an ether compound with a specific structure can solve the above-mentioned problems.

In other words, the present invention provides:

(1) lubricating oil for a compression refrigerator, having a polyalkylene glycol or polyoxyalkylene glycol unit and a polyether unit in a molecule and containing a polyvinyl ether compound with a molecular weight of 300 to 3,000;

(2) lubricating oil for a compression refrigerator, containing a polyvinyl ether compound having a molecular weight of 300 to 3,000, which is obtained by polymerization of vinyl ether compounds in the presence of a polymerization initiator, in which at least one of the polymerization initiator and the vinyl ether compound contains an alkylene glycol or polyoxy alkylene glycol residue; and (3) a refrigeration unit that is constructed of a compression-type refrigerant-circulating system for a natural refrigerant, in which the system includes at least a compressor a condenser, an expansion mechanism, and an evaporator, and that uses a natural refrigerant and the lubricating oil for a compression refrigerator described in the above-mentioned (1) or (2).

DESCRIPTION OF SYMBOLS

1: case
2: stator
3: motor roller
4: rotation shaft
5: winding part
6: upper compression chamber
7: lower compression chamber
8: muffler
9: accumulator
10: suction pipe

BEST MODE FOR CARRYING OUT THE INVENTION

The lubricating oil for a compression refrigerator (hereinafter, referred to simply as "lubricating oil") of the present invention has two aspects. That is:

(1) a lubricating oil I, characterized by including a polyvinyl ether compound having a polyalkylene glycol or polyoxyalkylene glycol unit and a polyvinyl ether unit in a molecule and a molecular weight in the range of 300 to 3,000; and

(2) a lubricating oil II, characterized by including a polyvinyl ether compound which has a molecular weight of 300 to 3,000 and is obtained by polymerizing vinyl ether compounds in the presence of a polymerization initiator, in which at least one of the polymerization initiator and the vinyl ether compounds contains an alkylene glycol residue or a polyoxyalkylene glycol residue.

In the present invention, examples of lubricating oil that meets the above-mentioned lubricating oil I or II include lubricating oil containing polyvinyl ether compounds 1 to 4 described below.

[Polyvinyl Ether Compound 1]

Polyvinyl ether compound 1 is an ether compound having a constitutional unit represented by the general formula (I):

[Chem 1]

wherein $R^1$, $R^2$, and $R^3$ each represent a hydrogen atom or a hydrocarbon group having 1 to 8 carbon atoms, which may be identical to or different from one another; $R^b$ represents a divalent hydrocarbon group having 2 to 4 carbon atoms; $R^a$ represents a hydrogen atom, an aliphatic or alicyclic hydrocarbon group having 1 to 20 carbon atoms, an aromatic group which has 1 to 20 carbon atoms and may have a substituent, an acyl group having 2 to 20 carbon atoms, or an oxygen-containing hydrocarbon group having 2 to 50 carbon atoms; $R^4$ represents a hydrocarbon group having 1 to 10 carbon atoms; when there are two or more of each of $R^a$, $R^b$ and $R^4$, they may be identical to or different from one another; m represents an average value of 1 to 50; k represents an average value of 1 to 50; p represents an average value of 0 to 50; when k and p each represent 2 or more, constitutional units may be in block or in random; and when there are two or more $R^bO$, they may be identical to or different from one another.

Here, specific examples of the hydrocarbon group having 1 to 8 carbon atoms represented by each of $R^1$, $R^2$, and $R^3$ include: alkyl groups such as a methyl group, an ethyl group, an n-propyl group, an isopropyl group, an n-butyl group, an isobutyl group, a sec-butyl group, a tert-butyl group, various pentyl groups, various hexyl groups, various heptyl groups, and various octyl groups; cycloalkyl groups such as a cyclopentyl group, a cyclohexyl group, various methylcyclohexyl groups, various ethylcyclohexyl groups, and various dimethylcyclohexyl groups; aryl groups such as a phenyl group, various methylphenyl groups, various ethylphenyl groups, and various dimethylphenyl groups; and arylalkyl groups such as a benzyl group, various phenylethyl groups, and various methylbenzyl groups. Each of $R^1$, $R^2$, and $R^3$ particularly preferably represents a hydrogen atom.

On the other hand, specific examples of the divalent hydrocarbon group having 2 to 4 carbon atoms represented by $R^b$ include divalent alkylene groups such as a methylene group, an ethylene group, a propylene group, a trimethylene group, and various butylene groups.

In addition, m in the general formula (I) represents the number of repeats of $R^bO$ with an average value thereof in the range of 1 to 50, preferably 2 to 20, more preferably 2 to 10, particularly preferably 2 to 5. When there are two or more $R^bO$, the two or more $R^b$ O may be identical to or different from one another.

Further, k represents 1 to 50, preferably 1 to 10, more preferably 1 to 2, particularly preferably 1, while p represents 0 to 50, preferably 2 to 25, more preferably 5 to 15. When k and p each represent 2 or more, constitutional units may be in block or in random.

Examples of the aliphatic or alicyclic hydrocarbon group having 1 to 20 carbon atoms represented by $R^a$ preferably include an alkyl group having 1 to 10 carbon atoms or a cycloalkyl group having 5 to 10 carbon atoms. Specific examples thereof include a methyl group, an ethyl group, an n-propyl group, an isopropyl group, an n-butyl group, an isobutyl group, a sec-butyl group, a tert-butyl group, various pentyl groups, various hexyl groups, various heptyl groups, various octyl groups, various nonyl groups, various decyl groups, a cyclopentyl group, a cyclohexyl group, various methylcyclohexyl groups, various ethylcyclohexyl groups, various propylcyclohexyl groups, and various dimethylcyclohexyl groups.

Specific examples of the aromatic group which has 1 to 20 carbon atoms and may have a substituent represented by $R^a$ include: aryl groups such as a phenyl group, various tolyl groups, various ethylphenyl groups, various xylyl groups, various trimethylphenyl groups, various butylphenyl groups, and various naphthyl groups; and arylalkyl groups such as a benzyl group, various phenylethyl groups, various methylbenzyl groups, various phenylpropyl groups, and various phenylbutyl groups.

In addition, examples of the acyl group having 2 to 20 carbon atoms represented by $R^a$ include an acetyl group, a propionyl group, a butyryl group, an isobutyryl group, a valeryl group, an isovaleryl group, a pivaloyl group, a benzoyl group, and toluoyl group.

Further, specific examples of the oxygen-containing hydrocarbon group having 2 to 50 carbon atoms represented by $R^a$ preferably include a methoxymethyl group, a methoxyethyl group, a methoxypropyl group, a 1,1-bismethoxypropyl group, a 1,2-bismethoxypropyl group, an ethoxypropyl group, a (2-methoxyethoxy)propyl group, and a (1-methyl-2-methoxy)propyl group.

In the general formula (I), specific examples of the hydrocarbon group having 1 to 10 carbon atoms represented by $R^4$ include: alkyl groups such as a methyl group, an ethyl group, an n-propyl group, an isopropyl group, an n-butyl group, an isobutyl group, various pentyl groups, various hexyl groups, various heptyl groups, various octyl groups, various nonyl groups, and various decyl groups; cycloalkyl groups such as a cyclopentyl group, a cyclohexyl group, various methylcyclohexyl groups, various ethylcyclohexyl groups, various propylcyclohexyl groups, and various dimethylcyclohexyl groups; aryl groups such as a phenyl group, various methylphenyl groups, various ethylphenyl groups, various dimethylphenyl groups, various propylphenyl groups, various trimethylphenyl groups, various butylphenyl groups, and various naphthyl groups; and arylalkyl groups such as a benzyl group, various phenylethyl groups, various methylbenzyl groups, various phenylpropyl groups, and various phenylbutyl groups.

Further, each of $R^1$ to $R^3$, $R^a$, $R^b$, m, and $R^1$ to $R^4$ may be identical to or different from one another in every constitutional unit.

The polyvinyl ether compound 1 can be obtained using as an initiator, for example, an alkylene glycol compound or a polyoxyalkylene glycol compound represented by the general formula (VI):

[Chem 2]

(VI)

and polymerizing vinyl ether compounds represented by the general formula (VII):
[Chem 3]

(VII)

wherein $R^a$, $R^b$, and m and $R^1$ to $R^4$ are as explained above.

Specific examples of the alkylene glycol compound or the polyoxyalkylene glycol compound include: alkylene glycols such as ethyleneglycol, ethylene glycol monomethyl ether, diethyleneglycol, diethylene glycol monomethyl ether, triethylene glycol, triethylene glycol monomethyl ether, propylene glycol, propylene glycol monomethyl ether, dipropylene glycol, dipropylene glycol monomethyl ether, tripropylene glycol, and tripropylene glycol monomethyl ether; a polyoxyalkylene glycol; and a monoether compound thereof.

Examples of the vinyl ether compound represented by the general formula (VII) include: vinyl ethers such as vinyl methyl ether, vinyl ethyl ether, vinyl-n-propyl ether, vinyl-isopropyl ether, vinyl-n-butyl ether, vinyl-isobutyl ether, vinyl-sec-butyl ether, vinyl-tert-butyl ether, vinyl-n-pentyl ether, and vinyl-n-hexyl ether; propenes such as 1-methoxypropene, 1-ethoxypropene, 1-n-propoxypropene, 1-isopropoxypropene, 1-n-butoxypropene, 1-isobutoxypropene, 1-sec-butoxypropene, 1-tert-butoxypropene, 2-methoxypropene, 2-ethoxypropene, 2-n-propoxypropene, 2-isopropoxypropene, 2-n-butoxypropene, 2-isobutoxypropene, 2-sec-butoxypropene, and 2-tert-butoxypropene; and butenes such as 1-methoxy-1-butene, 1-ethoxy-1-butene, 1-n-propoxy-1-butene, 1-isopropoxy-1-butene, 1-n-butoxy-1-butene, 1-isobutoxy-1-butene, 1-sec-butoxy-1-butene, 1-tert-butoxy-1-butene, 2-methoxy-1-butene, 2-ethoxy-1-butene, 2-n-propoxy-1-butene, 2-isopropoxy-1-butene, 2-n-butoxy-1-butene, 2-isobutoxy-1-butene, 2-sec-butoxy-1-butene, 2-tert-butoxy-1-butene, 2-methoxy-2-butene, 2-ethoxy-2-butene, 2-n-propoxy-2-butene, 2-isopropoxy-2-butene, 2-n-butoxy-2-butene, 2-isobutoxy-2-butene, 2-sec-butoxy-2-butene, and 2-tert-butoxy-2-butene. Those vinyl ether monomers can be produced by any known methods.

[Polyvinyl Ether Compound 2]

Polyvinyl ether compound 2 is an ether compound having a constitutional unit represented by the general formula (II):

(II)

In the general formula (II), $R^c$ represents a hydrogen atom, an alkyl group having 1 to 10 carbon atoms, an acyl group having 2 to 10 carbon atoms, or a hydrocarbon group having 1 to 10 carbon atoms and having 2 to 6 binding sites; $R^d$ and $R^f$ represent alkylene groups having 2 to 4 carbon atoms; a and e represent average values of 0 to 50; c represents an integer of 1 to 20; $R^e$ represents a hydrogen atom, an alkyl group having 1 to 10 carbon atoms, an alkoxy group having 1 to 10 carbon atoms, or an acyl group having 2 to 10 carbon atoms; and when a and/or e is 2 or more, $(OR^d)$ and/or $(OR^f)$ and (A) may be in random or in block.

(A) is represented by the general formula (III):
[Chem 4]

(III)

wherein $R^5$, $R^6$, and $R^7$ each represent a hydrogen atom or a hydrocarbon group having 1 to 8 carbon atoms, which may be identical to or different from one another; $R^8$ represents a divalent hydrocarbon group having 1 to 10 carbon atoms or a divalent hydrocarbon group containing ether-bonded oxygen and having 2 to 20 carbon atoms; $R^9$ represents a hydrogen atom or a hydrocarbon group having 1 to 20 carbon atoms; n represents an average value of 0 to 10; when n represents 2 or more, constitutional units may be identical to or different from one another; $R^5$ to $R^9$ may be identical to or different from one another in every constitutional unit; and when there are two or more $R^8O$, they may be identical to or different from one another. When b is 3 or more, d is an integer of 1 to 6, and both a and e are zero (0), n in one of the constitutional units A represents an integer of 1 or more.

Examples of the alkyl group having 1 to 10 carbon atoms represented by each of the above-mentioned $R^c$ and $R^e$ include: alkyl groups such as a methyl group, an ethyl group, an n-propyl group, an isopropyl group, an n-butyl group, an isobutyl group, various pentyl groups, various hexyl groups, various heptyl groups, various octyl groups, various nonyl groups, and various decyl groups; a cyclopentyl group; a cyclohexyl group; various methylcyclohexyl groups; various ethylcyclohexyl groups; various propylcyclohexyl groups; and various dimethylcyclohexyl groups. Examples of the acyl group having 2 to 10 carbon atoms include an acetyl group, a propionyl group, a butyryl group, an isobutyryl group, a valeryl group, an isovaleryl group, a pivaloyl group, a benzoyl group, and a toluoyl group.

Examples of the alkoxy group having 1 to 10 carbon atoms represented by $R^e$ include a methoxy group, an ethoxy group, a propoxy group, a butoxy group, a pentyloxy group, a hexyloxy group, a heptyloxy group, an octyloxy group, a nonyloxy group, and a decyloxy group.

Examples of the hydrocarbon group having 1 to 10 carbon atoms and having 2 to 6 binding sites represented by $R^c$ include residues obtained by removing hydroxy groups from polyhydric alcohols such as ethylene glycol, diethylene glycol, propylene glycol, dipropylene glycol, polypropylene glycol, neopentyl glycol, trimethylolethane, trimethylolpropane, glycerine, ditrimethylolpropane, diglycerine, pentaerythritol, dipentaerythritol, and sorbitol.

Example of the alkylene group having 2 to 4 carbon atoms represented by $R^d$ include an ethylene group, a propylene group, a trimethylene group, and various butylene groups.

In the general formula (III), examples of the hydrocarbon group having 1 to 8 carbon atoms represented by each of $R^5$ to $R^7$ include: alkyl groups such as a methyl group, an ethyl group, an n-propyl group, an isopropyl group, an n-butyl group, an isobutyl group, various pentyl groups, various hexyl groups, various heptyl groups, and various octyl groups; cycloalkyl groups such as a cyclopentyl group, a cyclohexyl group, various methylcyclohexyl groups, various ethylcyclohexyl groups, and various dimethylcyclohexyl groups; aryl groups such as a phenyl group, various methylphenyl groups, various ethylphenyl groups, and various dimethylphenyl groups; and arylalkyl groups such as a benzyl group, various phenylethyl groups, and various methylbenzyl groups. Each of $R^5$, $R^6$, and $R^7$ particularly preferably represents a hydrogen atom.

Specific examples of the divalent hydrocarbon group having 1 to 10 carbon atoms represented by $R^8$ include: divalent aliphatic groups such as a methylene group, an ethylene group, a phenylethylene group, a 1,2-propylene group, a 2-phenyl-1,2-propylene group, a 1,3-propylene group, various butylene groups, various pentylene groups, various hexylene groups, various heptylene groups, various octylene groups, various nonylene groups, and various decylene groups; alicyclic groups each having two biding sites on alicyclic hydrocarbon, such as cyclohexane, methylcyclohexane, ethylcyclohexane, dimethylcyclohexane, and propylcyclohexane; divalent aromatic hydrocarbon groups such as various phenylene groups, various methylphenylene groups, various ethylphenylene groups, various dimethylphenylene groups, and various naphthylene groups; alkyl aromatic groups each having a monovalent biding site on each of an alkyl group portion and an aromatic group portion of an alkyl aromatic hydrocarbon such as toluene, xylene, or ethylbenzene; and alkyl aromatic groups each having a binding site on an alkyl group portion of a polyalkyl aromatic hydrocarbon such as xylene and diethylbenzene. Among them, the aliphatic groups having 2 to 4 carbon atoms are particularly preferable.

In addition, specific examples of the divalent hydrocarbon group containing ether-bonded oxygen and having 2 to 20 carbon atoms represented by $R^8$ preferably include a methoxymethylene group, a methoxyethylene group, a methoxymethylethylene group, a 1,1-bismethoxymethylethylene group, a 1,2-bismethoxymethylethylene group, an ethoxymethylethylene group, a (2-methoxyethoxy)methylethylene group, and a (1-methyl-2-methoxy)methylethylene group.

Further, specific examples of the hydrocarbon group having 1 to 20 carbon atoms represented by $R^9$ include: alkyl groups such as a methyl group, an ethyl group, an n-propyl group, an isopropyl group, an n-butyl group, an isobutyl group, a sec-butyl group, a tert-butyl group, various pentyl groups, various hexyl groups, various heptyl groups, various octyl groups, various nonyl groups, and various decyl groups; cycloalkyl groups such as a cyclopentyl group, a cyclohexyl group, various methylcyclohexyl groups, various ethylcyclohexyl groups, various propylcyclohexyl groups, and various dimethylcyclohexyl groups; aryl groups such as a phenyl group, various methylphenyl groups, various ethylphenyl groups, various dimethylphenyl groups, various propylphenyl groups, various trimethylphenyl groups, various butylphenyl groups, and various naphthyl groups; and arylalkyl groups such as a benzyl group, various phenylethyl groups, various methylbenzyl groups, various phenylpropyl groups, and various phenylbutyl groups.

Polyvinyl compound 2 represented by the above-mentioned general formula (II) may be preferably one in which $R^c$ is a hydrogen atom, a and/or e=0, further c=1, and d=1 or one in which $R^e$ is a hydrogen atom, e=0, and c=1, or one that satisfies both of them in terms of the characteristics thereof as lubricating oil.

Further, preferable is one in which each of $R^5$ to $R^7$ is a hydrogen atom, n has an average value of 0 to 4 and any one of n is one or more, $R^8$ is a hydrocarbon group having 2 to 4 carbon atoms.

[Polyvinyl Ether Compound 3]

Polyvinyl ether compound 3 is an ether compound having a structure represented by the general formula (IV):

(IV)

In the general formula (IV), each of $R^c$, $R^d$, A, a, b, d, and e is the same as each of the general formula (II); and $R^g$ represents a hydrogen atom, an alkyl group having 1 to 10 carbon atoms, an alkoxy group having 1 to 10 carbon atoms, an acyl group having 2 to 10 carbon atoms, or a hydrocarbon group having 1 to 10 carbon atoms and having 2 to 6 binding sites; when a and/or e is 2 or more, $OR^d$ and/or $OR^f$ and A may be in random or in block; and when each of a and e is zero (0), n represents an integer of 1 or more in one of the constitutional units A.

Examples of the alkylene group having 2 to 4 carbon atoms represented by $R^f$ include an ethylene group, a propylene group, a trimethylene group, and various butylene groups.

Among $R^g$, the alkyl group having 1 to 10 carbon atoms, the acyl group having 2 to 10 carbon atoms, and the hydrocarbon groups having 1 to 10 carbon atoms and having 2 to 6 binding sites may be the same groups as those exemplified in the description about $R^c$ in the general formula (II).

Further, among $R^g$, the alkoxy group having 1 to 10 carbon atoms may be the same groups as those exemplified in the description about $R^c$ in the general formula (II).

Polyvinyl ether compound 3 represented by the above-mentioned general formula (IV) may be preferably one in which $R^c$ is a hydrogen atom and a=0, one in which $R^g$ is a hydrogen atom, d=1, and e=0, or one that satisfies both of them.

Further, preferable is one in which each of $R^5$ to $R^7$ is a hydrogen atom, n has an average value of 0 to 4 and any one of n is one or more, and $R^8$ is a hydrocarbon group having 2 to 4 carbon atoms.

[Polyvinyl Ether Compound 4]

Polyvinyl ether compound 4 is a block or random copolymer having (a) a constitutional unit represented by the above-mentioned general formula (III) and (b) a constitutional unit represented by the general formula (V):

[Chem 5]

(V)

wherein $R^{10}$ to $R^{13}$ each represent a hydrogen atom or a hydrocarbon group having 1 to 20 carbon atoms, which may be identical to or different from one another; and $R^{10}$ to $R^{13}$ may be identical to or different from one another in every constitutional unit.

In the general formula (V), among $R^{10}$ to $R^{13}$, the hydrocarbon group having 1 to 20 carbon atoms may be the same group as one exemplified in the description about $R^9$ in the above-mentioned general formula (III).

The polyvinyl ether compound 4 can be produced by copolymerizing, for example, a vinyl ether monomer represented by the general formula (VIII):

[Chem 6]

(VIII)

wherein $R^5$ to $R^9$ and n are identical with those described above, and a hydrocarbon monomer having an olefinic double bond represented by the general formula (IX):

[Chem 7]

(IX)

wherein $R^{10}$ to $R^{13}$ are identical with those described above.

Examples of the vinyl ether monomer represented by the general formula (VIII) include: vinyl ethers such as vinyl methyl ether, vinyl ethyl ether, vinyl-n-propyl ether, vinyl-isopropyl ether, vinyl-n-butyl ether, vinyl-isobutyl ether, vinyl-sec-butyl ether, vinyl-tert-butyl ether, vinyl-n-pentyl ether, vinyl-n-hexyl ether, vinyl-2-methoxyethyl ether, vinyl-2-ethoxyethyl ether, vinyl-2-methoxy-1-methylethyl ether, vinyl-2-methoxy-2-methyl ether, vinyl-3,6-dioxaheptyl ether, vinyl-3,6,9-trioxadecyl ether, vinyl-1,4-dimethyl-3,6-dioxaheptyl ether, vinyl-1,4,7-trimethyl-3,6,9-trioxadecyl ether, vinyl-2,6-dioxa-4-heptyl ether, and vinyl-2,6,9-trioxa-4-decyl ether; propenes such as 1-methoxypropene, 1-ethoxypropene, 1-n-propoxypropene, 1-isopropoxypropene, 1-n-butoxypropene, 1-isobutoxypropene, 1-sec-butoxypropene, 1-tert-butoxypropene, 2-methoxypropene, 2-ethoxypropene, 2-n-propoxypropene, 2-isopropoxypropene, 2-n-butoxypropene, 2-isobutoxypropene, 2-sec-butoxypropene, and 2-tert-butoxypropene; and butenes such as 1-methoxy-1-butene, 1-ethoxy-1-butene, 1-n-propoxy-1-butene, 1-isopropoxy-1-butene, 1-n-butoxy-1-butene, 1-isobutoxy-1-butene, 1-sec-butoxy-1-butene, 1-tert-butoxy-1-butene, 2-methoxy-1-butene, 2-ethoxy-1-butene, 2-n-propoxy-1-butene, 2-isopropoxy-1-butene, 2-n-butoxy-1-butene, 2-isobutoxy-1-butene, 2-sec-butoxy-1-butene, 2-tert-butoxy-1-butene, 2-methoxy-2-butene, 2-ethoxy-2-butene, 2-n-propoxy-2-butene, 2-isopropoxy-2-butene, 2-n-butoxy-2-butene, 2-isobutoxy-2-butene, 2-sec-butoxy-2-butene, and 2-tert-butoxy-2-butene. Those vinyl ether monomers can be produced by any known methods.

Examples of the hydrocarbon monomer having an olefinic double bond represented by the general formula (IX) include ethylene, propylene, various butenes, various pentenes, various hexenes, various heptenes, various octenes, diisobutylene, triisobutylene, styrene, and various alkyl-substituted styrenes.

In the present invention, the above-mentioned polyvinyl ether compounds 1 to 4 can be produced by radical polymerization, cationic polymerization, radiation polymerization, or the like of the corresponding vinyl ether compounds and optionally hydrocarbon monomers each having an olefinic double bond. For example, a polymerization product of the vinyl ether monomers having a desired viscosity can be obtained through polymerization by a method described below. For initiating the polymerization, any of combinations of Broensted acids, Lewis acids, or organic metal compounds with adducts of carboxylic acid with water, alcohols, phenols, acetals, or vinyl ethers can be used. Examples of the Broensted acids include hydrofluoric acid, hydrochloric acid, hydrobromic acid, hydroiodic acid, nitric acid, sulfuric acid, trichloroacetic acid, and trifluoroacetic acid. Examples of the Lewis acids include boron trifluoride, aluminum trichloride, aluminum tribromide, tin tetrachloride, zinc dichloride, and ferric chloride. Among those Lewis acids, boron trifluoride is particularly preferable. In addition, examples of the organic metal compounds include diethyl aluminum chloride, ethyl aluminum chloride, and diethyl zinc.

The adducts of water, alcohols, phenols, acetals, or vinyl ethers with carboxylic acid to be combined with the compounds can be optionally selected. Here, examples of the alcohols include: saturated aliphatic alcohols having 1 to 20 carbon atoms, such as methanol, ethanol, propanol, isopropanol, butanol, isobutanol, sec-butanol, tert-butanol, various pentanols, various hexanols, various heptanols, and various octanols; unsaturated aliphatic alcohols having 3 to 10 carbon atoms such as allyl alcohol; and monoethers of alkylene glycols, such as ethylene glycol monomethyl ether, diethylene glycol monomethyl ether, triethylene glycol monomethyl ether, propylene glycolmonomethyl ether, dipropylene glycol monomethyl ether, and tripropylene glycol monomethyl ether. Examples of the carboxylic acids when adducts thereof with vinyl ethers are used include acetic acid, propionic acid, n-butyric acid, isobutyric acid, n-valeric acid, isovaleric acid, 2-methylbutyric acid, pivalic acid, n-caproic acid, 2,2-dimethyl butyric acid, 2-methyl valeric acid, 3-methyl valeric acid, 4-methyl valeric acid, enanthic acid, 2-methyl caproic acid, caprylic acid, 2-ethyl caproic acid, 2-n-propyl valeric acid, n-nonanoic acid, 3,5,5-trimethyl caproic acid, caprylic acid, and undecanoic acid.

The vinyl ethers when adducts thereof with carboxylic acids are used may be identical with those used in polymerization or may be different. The adducts of the vinyl ethers with the carboxylic acid can be obtained by mixing and reacting them at a temperature of about 0 to 100° C., and they can be separated by distillation or the like and then used for a reaction. Alternatively, it may be directly used for a reaction without separation.

When water, alcohol, or phenol is used, a hydrogen atom binds to the end of the polymer for polymerization initiation. In contrast, when acetal is used, a hydrogen atom or one of alkoxy groups of the acetal used can be detached. In addition, when an adduct of vinyl ether with carboxylic acid is used, an alkyl carbonyloxy group originated from a carboxylic acid portion is detached from the adduct of the vinyl ether with the carboxylic acid.

On the other hand, when any of water, alcohols, phenols, and acetals is used, the end of the polymer for terminating the polymerization becomes acetal, olefin, or aldehyde. In addition, in the case of an adduct of vinyl ether with carboxylic acid, it becomes carboxylic acid ester of hemiacetal. The ends of the polymer thus obtained can be converted into desired groups by a method known in the art. Examples of the desired groups include residues such as saturated hydrocarbon, ether, alcohol, ketone, nitrile, and amide. Among them, the residues such as saturated hydrocarbon, ether, and alcohol are preferable.

The polymerization of vinyl ether monomers represented by the general formula (VIII) can be initiated at a temperature ranging from −80 to 150° C., usually from −80 to 50° C., depending on the kinds of raw materials and initiators. In addition, the polymerization reaction can be completed within about 10 seconds to 10 hours after initiation of the reaction. As for controlling the molecular weight of the polymer, a polymer having a low average molecular weight can be obtained by increasing the amount of an adduct of carboxylic acid with water, alcohols, phenols, acetals, and vinyl ethers with respect to the vinyl ether monomers represented by the general formula (VIII).

Further, a polymer having a low average molecular weight can be obtained by increasing the amount of the Broensted acid or Lewis acid. This polymerization reaction is usually performed in the presence of a solvent. The solvent may be any of solvents that dissolve the amounts of reaction raw materials required and are inert to the reaction. Examples thereof which can be preferably used include, but not particularly limited to: hydrocarbon solvents such as hexane, benzene, and toluene; and ether solvents such as ethyl ether, 1,2-dimethoxyethane, and tetrahydrofuran. Further, this polymerization reaction can be terminated by the addition of alkali. After completion of the polymerization reaction, if required, common separation and purification procedures may be carried out to obtain a polyvinyl ether compound of interest.

The polyvinyl ether compound to be included in each of lubricating oil I and II of the present invention may preferably have a carbon/oxygen molar ratio of 4 or less. If the molar ratio exceeds 4, the compatibility of a lubricating oil to a natural refrigerant, such as carbon dioxide, decreases. As for adjustment of the molar ratio, the adjustment of a carbon/oxygen molar ratio of a raw material monomer can lead to the production of a polymer having such a molar ratio within the above-mentioned range. In other words, the larger the percentage of a monomer having a high carbon/oxygen molar ratio is, the higher the carbon/oxygen ratio of the polymer obtained is. In contrast, the larger the percentage of monomer having a low carbon/oxygen molar ratio is, the lower the carbon/oxygen ratio of obtained polymer is. As mentioned in the method of polymerizing the vinyl ether monomers, the adjustment of the carbon/oxygen molar ratio may be attained by any of combinations of monomers with adducts, which are used as initiators, of carboxylic acid with water, alcohols, phenols, acetals, and vinyl ethers. When any of alcohols, phenols, and the like having carbon/oxygen molar ratios larger than those of monomers to be polymerized is used as an initiator, a polymer having a carbon/oxygen ratio larger than those of raw material monomers can be obtained. In contrast, when any of alcohols having smaller carbon/oxygen molar ratios, such as methanol and methoxy ethanol, is used, a polymer having a carbon/oxygen ratio smaller than those of raw material monomers can be obtained.

Further, when a vinyl ether monomer is copolymerized with a hydrocarbon monomer having an olefinic double bond, a polymer having a carbon/oxygen molar ratio larger than that of the vinyl ether monomer can be obtained. In this case, the ratio can be adjusted with the percentage of the hydrocarbon monomer having an olefinic double bond to be used or with the number of carbon atoms thereof.

The lubricating oil for a compression refrigerator of the present invention contains the above-mentioned polyvinyl ether compound in an amount of preferably 70% by mass or more, more preferably 80% by mass or more, still more preferably 90% by mass or more, particularly preferably 100% by mass. For the vinyl ether compound, any one of vinyl ether compounds may be used alone or two or more of them may be used in combination. The kind of base oil for lubricating oil other than the polyvinyl ether compound, which can be used in a percentage of 30% by mass or less in combination, is not particularly limited.

For the lubricating oil of the present invention, a kinematic viscosity thereof yet to be mixed with a refrigerant is preferably in the range of 1 to 50 mm$^2$, particularly preferably in the range of 5 to 25 mm$^2$ at 100° C. In addition, it has a viscosity index of preferably 80 or more, more preferably 90 or more, still more preferably 100 or more.

Further, it is preferable that the lubricating oil of the present invention has a carbon/oxygen molar ratio of 4 or less. If the molar ratio exceeds 4, the compatibility thereof to carbon dioxide decreases.

In addition, if required, the lubricating oil of the present invention may be suitably added with any of various additives, which have been commonly used in the art, including: agents for imparting load capacities; chlorine scavengers; antioxidants; metal deactivators; anti-foaming agents such as silicone; detergent dispersants; viscosity index improvers; oiliness agents such as tatty acid; antifriction agents such as zinc dithiophosphate; chlorinated paraffin; extreme pressure agents such as sulfur compounds; anti-rust agents; anti-corrosive agents; and pour-point depressants.

Examples of the agents for imparting load capacities, which can be used, include: those based on organosulfur compounds, such as monosulfides, polysulfides, sulfoxides, sulfones, thiosulfinates, sulfurized fat and oil, thiocarbonates, thiophenes, thiazoles, and methanesulfonic esters; those based on phosphoric esters, such as phosphoric monoesters, phosphoric diesters, and phosphoric triesters (tricresyl phosphate); those based on phosphorites, such as phosphorous monoesters, phosphorous diesters, and phosphorous triesters; those based on thiophosphoric acid esters, such as thiophosphoric acid triesters; those based on fatty acid esters, such as higher fatty acids, hydroxyaryl fatty acids, carboxylic acid-containing polyalcohol esters, and acrylate esters; those based on organic chlorides, such as chlorinated hydrocarbons and chlorinated carboxylic acid derivatives; those based on organic fluorides, such as fluorinated aliphatic carboxylic acids, fluorinated ethylene resins, fluorinated alkyl polysiloxanes, and fluorinated graphite; those based on alcohols, such as higher alcohol; and those based on metal compounds, such as naphthenates (lead naphthenate), fatty acid salts (fatty acid lead), thiophosphates (dialkyl phosphorodithioate), thiocarbamic acid salts, organomolybdenum compounds, organotin compounds, organogermanium compounds, and borate esters.

Examples of the chlorine scavengers, which can be used, include compounds containing glycidyl ether groups, α-olefin oxides, epoxylated aliphatic acid monoesters, epoxylated fat and oil, and compounds containing epoxycycloalkyl groups. Examples of the antioxidants, which can be used, include phenols (2,6-di-tertiary-butyl-p-cresol) and aromatic amines (α-naphthyl amine) Examples of the metal deactivators include benzotriazole derivatives. Examples of the anti-foaming agents include silicone oil (dimethyl polysiloxane) and polymethacrylates Examples of the detergent dispersant, which can be used, include sulfonates, phenates, and succinate imides. Examples of the viscosity index improvers, which can be used, include polymethacrylates, polyisobutylenes, ethylene-propylene copolymers, and hydrogenated styrene-diene copolymers.

The blending amount of each of those additives is typically in the range of about 0.001 to 10% by mass with reference to the total amount of the lubricating oil.

Further, the lubricating oil of the present invention is suitable for natural refrigerants. Examples of the natural refrigerants include a carbon dioxide ($CO_2$) refrigerant, an ammonia refrigerant, and a hydrocarbon refrigerant.

Examples of the hydrocarbon refrigerant include isobutane, n-butane, and propane, and a mixture thereof.

The lubricating oil of the present invention is excellent in lubrication property as well as compatibility to a carbon-dioxide refrigerant. In particular, therefore, it is suitably used as a lubricating oil of a system for circulating a carbon dioxide compression refrigerant.

Further, in the present invention, any of mixture refrigerants of the respective natural refrigerants as described above may be used. In addition, mixture refrigerants of the above-mentioned natural refrigerants with HFC refrigerants, fluorine-containing ether refrigerants, and fluorine-free refrigerants such as dimethyl ethers may be also used.

Next, the refrigeration unit of the present invention is constructed of a system for circulating a compression refrigerant. The system includes at least a compressor, a condenser, an expansion mechanism (e.g., an expansion valve), and an evaporator. Alternatively, the system essentially includes a compressor, a condenser, an expansion mechanism, a drier, and an evaporator. The refrigeration unit of the present invention preferably uses a natural refrigerant, such as carbon dioxide, and the lubricating oil of the present invention as lubricating oil (refrigerator oil).

Here, the drier is preferably filled with a desiccating agent consisting of zeolite with a pore diameter of 3.5 Å or less. In addition, the zeolite may be natural zeolite or synthetic zeolite.

In the present invention, the use of such a desiccating agent can efficiently remove moisture without absorbing a refrigerant during the period of a refrigerating cycle and simultaneously prevent powderization of the desiccating agent due to its degradation. Therefore, there is no possibility of causing blockage of a pipe arrangement caused by the powderization of the desiccating agent, abnormal abrasion due to the invasion of the powder into a sliding part of the compressor, or the like thereby allowing the refrigeration unit to be stably driven for a long period of time.

Further, the refrigeration unit of the present invention constitutes a circulation system as a refrigerating cycle in the refrigeration unit such as a closed compressor of a high- or low-internal pressure type, in which both a compressor and an electric motor are covered with a common cover, or may be an opened or semi-closed compressor or a canned-motor compressor, in which a driving part of the compressor is placed outside.

In any of the types described above, it is preferable that the winding of a stationary part of an electric motor (motor) has a core wire (e.g., a magnetic wire) covered with enamel having a glass transition temperature of 130° C. or an enameled wire fixed with varnish having a glass transition temperature of 50° C. or more. Further, the enamel covering is preferably of a single layer of polyester imide, polyimide, polyamide, or polyamide imide or of a multiple layer thereof. In particular, an enamel covering, which is prepared by laminating a layer having a high glass transition temperature as an upper layer on a layer having a low glass transition temperature as a lower layer, is excellent in water resistance, softening resistance, and swelling resistance, as well as excellent in mechanical strength, rigidity, and insulation, thereby having a high practical utility value.

Further, in the refrigeration unit, an insulation film which serves as an electrical insulation material of a motor part is preferably one made of a crystalline plastic film having a glass transition temperature of 60° C. or more. In particular, the crystalline plastic film may preferably be one containing an oligomer in amount of 5% by mass or less.

Preferable examples of such the crystalline plastic having a glass transition temperature of 60° C. or more include polyether nitrile, polyethylene terephthalate, polybutylene terephthalate, polyphenylene sulfide, polyether ether ketone, polyethylene naphthalate, polyamide imide, and polyimide.

In addition, the insulation film of the above-mentioned motor may be made of a single-layered crystalline plastic film; alternatively it may be a composite film in which a plastic layer having a high glass transition temperature covers a film having a low glass transition temperature.

In the refrigeration unit of the present invention, a rubber material for vibration insulation can be arranged in the compressor. In this case, the rubber material which is suitably used is one selected from acrylonitrile butadiene rubber (NBR), ethylene-propylene-diene rubber (EPDM, EPM), hydrogenated acrylonitrile-butadiene rubber (HNBR), silicone rubber, and fluorine rubber (FKM). Particularly preferable is one having a rubber-swelling rate of 10% by mass or less.

Further, in the refrigeration unit of the present invention, any of various organic materials (e.g., lead wire-covering materials, binding threads, enameled wires, and insulation films) can be arranged in the compressor. In this case, however, the organic material, which can be suitably used, is one having a tensile strength lowering rate of 20% or less.

In the refrigeration unit of the present invention, further, it is preferable that a gasket in the compressor has a swelling rate of 20% or less.

Figure 1:
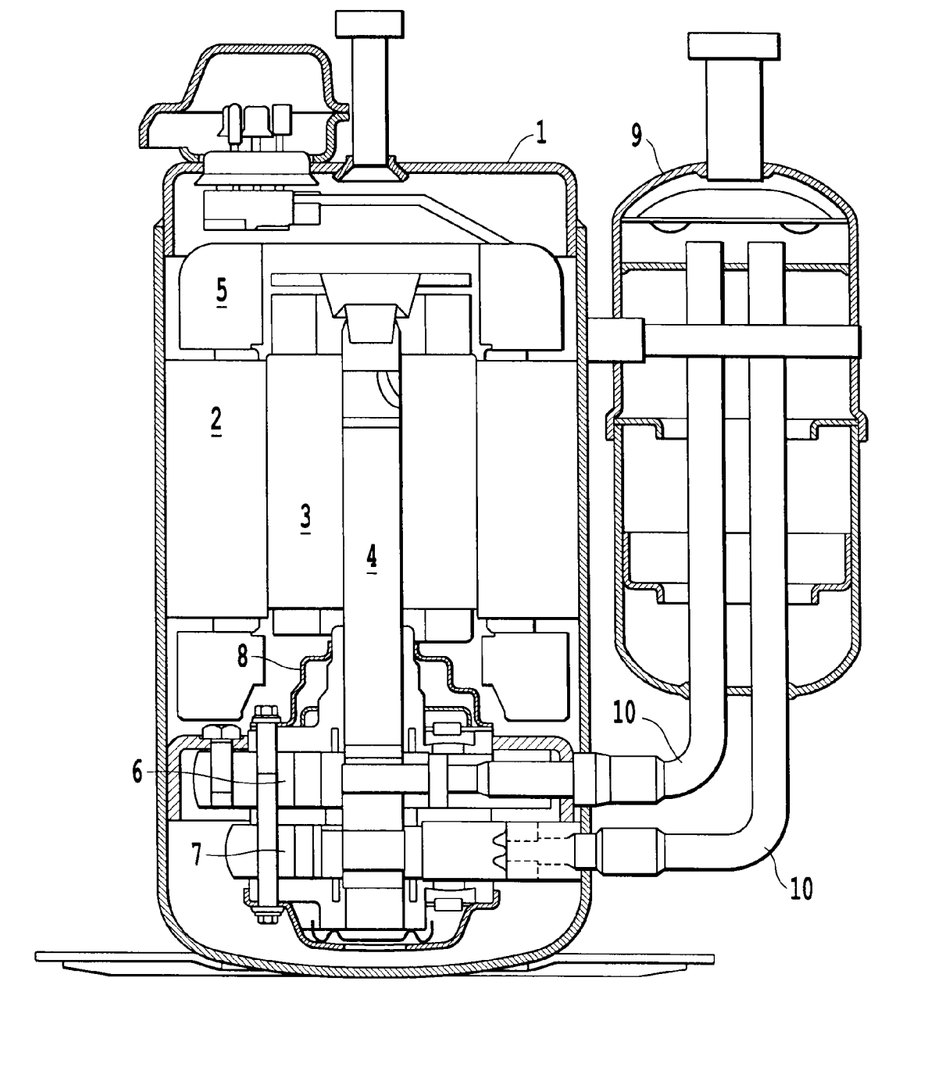
FIG. 1 A vertical cross-sectional diagram of a main part of an example of a compression refrigerator in the refrigeration unit of the present invention.

Next, specific examples of the refrigeration unit of the present invention include a closed scroll compressor, a closed swing compressor, a closed round-trip compressor, and a closed rotary compressor. Here, an example of the closed rotary compressor will be described with reference to the accompanying drawing.

FIG. 1 is a cross-sectional diagram of a main part of an example of a closed twin-rotary compressor as one kind of the refrigeration unit of the present invention. A motor part (electric motor part) is housed in a case as a sealed container, which also serves as an oil reservoir, on the upper stage. In addition, a compressor part is housed in the case on the lower stage. The motor part is constructed of a stator (stationary part) 2 and a motor roller (rotator) 3, in which a rotation shaft 4 is attached to the motor roller 3 by fitting together. In addition, a winding part 5 of the stator 2 has a core wire generally covered with an enameled wire, and furthermore an electrical insulation film is arranged between the core wire and the winding part of the stator 2 by insertion. On the other hand, a compressor part is constructed of two compression chambers, that is, an upper compression chamber 6 and a lower compression chamber 7.

The compressor discharges compressed refrigerant gas alternately from the upper and lower compression chambers 6 and 7 at a phase difference of 180 degrees. In the compression chamber, a cylindrical rotating piston is driven by a crank inserted therein and then eccentrically rotates while touching one point of the wall surface of the cylinder. In addition, a blade is spring-loaded and reciprocates so that the tip of the blade can always touch the rotating piston. Here, when the rotating piston eccentrically rotates, the capacity of one of two spaces divided by the blade decreases, thereby compressing refrigerant gas. When the pressure reaches a certain degree, a valve provided on a bearing flange surface opens, thereby discharging the refrigerant gas outside.

The opened compressor may be a car air-conditioner, the semi-closed compressor may be a high-speed multi-cylindered compressor, and the canned motor compressor may be an ammonia compressor.

EXAMPLES

Next, the present invention will be described in more detail with reference to examples. However, the present invention is not limited by the examples described below.

Catalyst Preparation Example 1

A 2-liter autoclave made of SUS316L was fed with 6 g of a nickel diatomaceous earth catalyst (a product of Nikki Chemical Co., Ltd., N113) and 300 g of isooctane. The autoclave was purged with nitrogen and then purged with hydrogen, followed by increasing the temperature therein while the pressure of hydrogen was adjusted to 3.0 MPaG. After retaining the autoclave at 140° C. for 30 minutes, the autoclave was cooled to room temperature. The autoclave was purged with nitrogen and then fed with 10 g of acetaldehyde diethyl acetal. The autoclave was purged with nitrogen again and then purged with hydrogen, followed by increasing the temperature therein while the pressure of hydrogen was adjusted to 3.0 MPaG. After retaining the autoclave at 130° C. for 30 minutes, the autoclave was cooled to room temperature. A decrease in hydrogen pressure was confirmed as the reaction of acetaldehyde diethyl acetal proceeded while an increase in temperature allowed an increase in inner pressure of the autoclave. When the pressure decreased to 3.0 MPaG or less, hydrogen was additionally supplied, thereby keeping the reaction pressure at 3.0 MPaG. The autoclave was cooled to room temperature and then depressurized. Subsequently, the autoclave was purged with nitrogen and then depressurized.

Production Example 1

A 1-liter separable flask made of glass was fed with 60.5 g of isooctane, 30.0 g ($2.50 \times 10^{-1}$ mol) of diethylene glycolmonomethyl ether, and 0.296 g of a boron trifluoride diethyl ether complex. Subsequently, 216.3 g (3.00 mol) of ethyl vinyl ether was added over 3 hours and 35 minutes. A reaction was exothermic, so a reaction solution was kept at 25° C. by placing the flask in an ice-water bath. After that, the reaction solution was transferred to a 1-liter separation funnel and washed with 50 ml of a 5% by mass aqueous solution of sodium hydroxide and then washed with 100 ml of distilled water six times, followed by removing the solvent and light components using a rotary evaporator under reduced pressure. Consequently, 235.1 g of a crude product was obtained.

The crude product had kinematic viscosities of 79.97 $mm^2$/s at 40° C. and 9.380 $mm^2$/s at 100° C.

Next, the autoclave containing the catalyst prepared in Catalyst Preparation Example 1 was opened and a liquid layer was then removed by decantation, followed by charging 300 g of isooctane and 100 g of the above-mentioned crude product. The autoclave was purged with nitrogen and then purged with hydrogen, followed by increasing the temperature therein while the pressure of hydrogen was adjusted to 3.0 MPaG. After retaining the autoclave at 160° C. for 3 hours, the autoclave was cooled to room temperature. A decrease in hydrogen pressure was confirmed as the reaction proceeded while an increase in temperature allowed an increase in inner pressure of the autoclave. When the pressure of hydrogen decreases, hydrogen was suitably supplied, thereby keeping the inside of the autoclave at 3.0 MPaG. The autoclave was purged with nitrogen and then depressurized, followed by recovering a reaction solution and then removing the catalyst therefrom by filtration.

A filtrate was subjected to a rotary evaporator under reduced pressure to remove the solvent and light components.

Consequently, a base oil 1 was obtained. The yield thereof was 88.5 g. A theoretical structure of the base oil 1 estimated from the feed was (A) $R^y=CH_2CH_2$, m=2, $R^z=CH_3$, (B) $R^x=CH_2CH_3$, (A)/(B) molar ratio (k/p)=1/11, k+p=12 (average value), and a calculated molecular weight of 940, from the formula (X) represented below. In addition, a carbon/oxygen molar ratio was 3.64.

[Chem 8]

(X)

Production Example 2

A 1-liter separable flask made of glass was fed with 60.5 g of isooctane, 25.0 g ($1.69 \times 10^{-1}$ mol) of dipropylene glycol monomethyl ether, and 0.200 g of a boron trifluoride diethyl ether complex. Subsequently, 133.8 g (1.86 mol) of ethyl vinyl ether was added over 3 hours.

After that, 151.8 g of a crude product was obtained by the same way as that of Production Example 1. The crude product had kinematic viscosities of 86.24 mm$^2$/s at 40° C. and 9.620 mm$^2$/s at 100° C.

Next, the autoclave containing the catalyst prepared in Catalyst Preparation Example 1 was opened and a liquid layer was then removed by decantation, followed by charging 300 g of isooctane and 100 g of the above-mentioned crude product. The autoclave was purged with nitrogen and then purged with hydrogen, followed by obtaining a base oil 2 by the same way as that of Production Example 1.

The yield thereof was 92.4 g. A theoretical structure of the base oil 2 estimated from the feed is (A) $R^y=CH(CH_3)CH_2$, m=2, $R^z=CH_3$, (B) $R^x=CH_2CH_3$, (A)/(B) molar ratio (k/p)=1/10, k+p=11 (average value), and a calculated molecular weight of 896, from the formula (X). In addition, the carbon/oxygen molar ratio is 3.77.

Production Example 3

A 1-liter separable flask made of glass was fed with 60.5 g of toluene, 25.0 g ($1.52 \times 10^{-1}$ mol) of triethylene glycol monomethyl ether, and 0.180 g of a boron trifluoride diethyl ether complex. Subsequently, 158.0 g (2.19 mol) of ethyl vinyl ether was added over 2 hours and 25 minutes.

After that, 174.7 g of a crude product was obtained by the same way as that of Production Example 1. The crude product had kinematic viscosities of 81.98 mm$^2$/s at 40° C. and 9.679 mm$^2$/s at 100° C.

Next, the autoclave containing the catalyst prepared in Catalyst Preparation Example 1 was opened and a liquid layer was then removed by decantation, followed by charging 300 g of isooctane and 100 g of the above-mentioned crude product. The autoclave was purged with nitrogen and then purged with hydrogen, followed by obtaining a base oil 3 by the same way as that of Production Example 1.

The yield thereof was 93.0 g. A theoretical structure of the base oil 3 estimated from the feed is (A) $R^y=CH_2CH_2$, m=3, $R^z=CH_3$, (B) $R^x=CH_2CH_3$, (A)/(B) molar ratio (k/p)=1/13.4, k+p=14.4 (average value), and a calculated molecular weight of 1,157, from the formula (X). In addition, the carbon/oxygen molar ratio is 3.60.

Production Example 4

A 1-liter separable flask made of glass was fed with 60.5 g of isooctane, 51.6 g ($2.50 \times 10^{-1}$ mol) of tripropylene glycol monomethyl ether, and 0.296 g of a boron trifluoride diethyl ether complex. Subsequently, 198.4 g (2.75 mol) of ethyl vinyl ether was added over 3 hours and 10 minutes. 241.7 got a crude product was obtained by the same way as that of Production Example 1. The crude product had kinematic viscosities of 83.13 mm$^2$/s at 40° C. and 9.755 mm$^2$/s at 100° C.

Next, the autoclave containing the catalyst prepared in Catalyst Preparation Example 1 was opened and a liquid layer was then removed by decantation, followed by charging 300 g of isooctane and 100 g of the above-mentioned crude product. The autoclave was purged with nitrogen and then purged with hydrogen, followed by obtaining a base oil 4 by the same way as that of Production Example 1.

The yield thereof was 92.6 g. A theoretical structure of the base oil 4 estimated from the feed is (A) $R^y=CH(CH_3)CH_2$, m=3, $R^z=CH_3$, (B) $R^x=CH_2CH_3$, (A)/(B) molar ratio (k/p)=1/10, k+p=11 (average value), and a calculated molecular weight of 954, from the formula (X). In addition, the carbon/oxygen molar ratio is 3.71.

Production Example 5

A 1-liter separable flask made of glass was fed with 43 g of toluene, 6.09 g ($8.00 \times 10^{-2}$ mol) of 2-methoxyethanol, and 0.095 g of a boron trifluoride diethyl ether complex. Subsequently, 102.1 g (1.00 mol) of methoxyethyl vinyl ether was added over 3 hours and 35 minutes. A reaction was exothermic, so a reaction solution was kept at 25° C. by placing the flask in an ice-water bath. After completion of the reaction, the reaction solution was transferred to a 1-liter separation funnel, followed by addition of an aqueous solution of 10% by mass of sodium hydroxide until the reaction solution was alkalinized. Subsequently, the reaction solution was transferred to a 1-liter eggplant type flask, added with an ion-exchange resin, and stirred to neutralize the reaction solution. From the solution, the solvent, moisture, and light components were removed using a rotary evaporator under reduced pressure, resulting in 106.4 g of a crude product. The crude product had kinematic viscosities of 78.53 mm$^2$/s at 40° C. and 12.34 mm$^2$/s at 100° C.

Next, the autoclave containing the catalyst prepared in Catalyst Preparation Example 1 was opened and a liquid layer was then removed by decantation, followed by charging 300 g of isooctane, 50 g of 2-methoxyethanol, and 68 g of the above-mentioned crude product. The autoclave was purged with nitrogen and then purged with hydrogen, followed by increasing the temperature therein while the pressure of hydrogen was adjusted to 3.0 MPaG.

After retaining the autoclave at 160° C. for 3 hours, the autoclave was cooled to room temperature. It was recognized that an increase in temperature caused an increase in pressure of the autoclave, while the hydrogen pressure decreased as the reaction proceeded.

When the hydrogen pressure decreased, hydrogen was additionally supplied, thereby keeping the reaction pressure at 3.0 MPaG. The autoclave was purged with nitrogen and then depressurized, followed by collecting the reaction solution and removing the catalyst by filtration.

A filtrate was subjected to a rotary evaporator under reduced pressure to remove the solvent and the light components, thereby obtaining a base oil 5. The yield thereof was 57.3 g. A theoretical structure of the base oil 5 estimated from the feed is (A) $R^y$=CH$_2$CH$_2$, m=1, $R^z$=CH$_3$, (B) p=0, k=12.5 (average value), and a calculated molecular weight of 1,277, from the formula (X). In addition, the carbon/oxygen molar ratio is 2.50.

Production Example 6

A 1-liter separable flask made of glass was fed with 60.5 g of isooctane, 50.0 g (1.85×10$^{-1}$ mol) of polypropylene glycol monomethyl ether (having an average molecular weight of about 270), and 0.224 g of a boron trifluoride diethyl ether complex. Subsequently, 122.8 g (1.70 mol) of ethyl vinyl ether was added over 1 hour and 50 minutes. After that, 167.7 g of a crude product was obtained by the same way as that of Production Example 1. The crude product had kinematic viscosities of 67.23 mm$^2$/s at 40° C. and 8.991 mm$^2$/s at 100° C.

Next, the autoclave containing the catalyst prepared in Catalyst Preparation Example 1 was opened and a liquid layer was then removed by decantation, followed by charging 300 g of isooctane and 100 g of the above-mentioned crude product. The autoclave was purged with nitrogen and then purged with hydrogen, followed by obtaining a base oil 6 by the same way as that of Production Example 1.

The yield thereof was 92.9 g. A theoretical structure of the base oil 6 estimated from the feed is (A) $R^y$=CH(CH$_3$)CH$_2$, m=4.1 (average value), $R^z$=CH$_3$, (B) $R^x$=CH$_2$CH$_3$, (A)/(B) molar ratio (k/p)=1/8.2, k+p=9.2 (average value), and a calculated molecular weight of 888, from the formula (X). In addition, the carbon/oxygen molar ratio is 3.62.

Production Example 7

A 1-liter separable flask made of glass was fed with 60.5 g of isooctane, 55.0 g (1.72×10$^{-1}$ mol) of polypropylene glycol monomethyl ether (having an average molecular weight of about 320), and 0.202 g of a boron trifluoride diethyl ether complex. Subsequently, 123.0 g (1.71 mol) of ethyl vinyl ether was added over 1 hour and 50 minutes. After that, 172.6 g of a crude product was obtained by the same way as that of Production Example 1. The crude product had kinematic viscosities of 81.59 mm$^2$/s at 40° C. and 10.50 mm$^2$/s at 100° C.

Next, the autoclave containing the catalyst prepared in Catalyst Preparation Example 1 was opened and a liquid layer was then removed by decantation, followed by charging 300 g of isooctane and 100 g of the above-mentioned crude product. The autoclave was purged with nitrogen and then purged with hydrogen, followed by obtaining a base oil 7 by the same way as that of Production Example 1.

The yield thereof was 93.3 g. A theoretical structure of the base oil 7 estimated from the feed is (A) $R^y$=CH(CH$_3$) CH$_2$, m=5.0 (average value), $R^z$=CH$_3$, (B) $R^x$CH$_2$CH$_3$, (A)/(B) molar ratio (k/p)=1/8.9, k+p=9.9 (average value), and a calculated molecular weight of 991, from the formula (X). In addition, the carbon/oxygen molar ratio is 3.60.

Production Example 8

A 1-liter separable flask made of glass was fed with 60.5 g of isooctane, 70.0 g (1.79×10$^{-1}$ mol) of polypropylene glycol monomethyl ether (having an average molecular weight of about 390), and 0.218 g of a boron trifluoride diethyl ether complex. Subsequently, 106.2 g (1.47 mol) of ethyl vinyl ether was added over 1 hour and 35 minutes. After that, 168.8 g of a crude product was obtained by the same way as that of Production Example 1. The crude product had kinematic viscosities of 59.08 mm$^2$/s at 40° C. and 8.930 mm$^2$/s at 100° C.

Next, the autoclave containing the catalyst prepared in Catalyst Preparation Example 1 was opened and a liquid layer was then removed by decantation, followed by charging 300 g of isooctane and 100 g of the above-mentioned crude product. The autoclave was purged with nitrogen and then purged with hydrogen, followed by obtaining a base oil 8 by the same way as that of Production Example 1.

The yield thereof was 92.9 g. A theoretical structure of the base oil 8 estimated from the feed is (A) $R^y$=CH(CH$_3$)CH$_2$, m=6.2 (average value), $R^z$=CH$_3$, (B) $R^x$=CH$_2$CH$_3$, (A)/(B) molar ratio (k/p)=1/7.2, k+p=8.2 (average value), and a calculated molecular weight of 938, from the formula (X). In addition, the carbon/oxygen molar ratio is 3.50.

Production Example 9

A 1-liter separable flask made of glass was fed with 60.5 g of isooctane, 70.0 g (1.59×10$^{-1}$ mol) of polypropylene glycol monomethyl ether (having an average molecular weight of about 440), and 0.189 g of a boron trifluoride diethyl ether complex. Subsequently, 103.6 g (1.47 mol) of ethyl vinyl ether was added over 1 hour 30 minutes. After that, 167.2 g of a crude product was obtained by the same way as that of Production Example 1. The crude product had kinematic viscosities of 75.63 mm$^2$/s at 40° C. and 10.75 mm$^2$/s at 100° C.

Next, the autoclave containing the catalyst prepared in Catalyst Preparation Example 1 was opened and a liquid layer was then removed by decantation, followed by charging 300 g of isooctane and 100 g of the above-mentioned crude product. The autoclave was purged with nitrogen and then purged with hydrogen, followed by obtaining Production a base oil 9 by the same way as that of Production Example 1.

The yield thereof was 93.0 g. A theoretical structure of the base oil 9 estimated from the feed is (A) $R^y$=CH(CH$_3$)CH$_2$, m=7.0 (average value), $R^z$=CH$_3$, (B) $R^x$=CH$_2$CH$_3$, (A)/(B) molar ratio (k/p)=1/8.2, k+p=9.2 (average value), and a calculated molecular weight of 1,056, from the formula (X). In addition, the carbon/oxygen molar ratio is 3.51.

Production Example 10

A 1-liter separable flask made of glass was fed with 60.6 g of isooctane, 30.9 g (1.50×10$^{-1}$ mol) of tripropylene glycol monomethyl ether, and 0.178 g of a boron trifluoride diethyl ether complex. Subsequently, 162.3 g (2.25 mol) of ethyl vinyl ether was added over 1 hour and 44 minutes. After that, 189.4 g of a crude product was obtained by the same way as that of Production Example 1. The crude product had kinematic viscosities of 257.3 mm$^2$/s at 40° C. and 20.03 mm$^2$/s at 100° C.

Next, the autoclave containing the catalyst prepared in Catalyst Preparation Example 1 was opened and a liquid layer was then removed by decantation, followed by charging 300 g of isooctane and 100 g of the above-mentioned crude product. The autoclave was purged with nitrogen and then purged with hydrogen, followed by obtaining a base oil 10 by the same way as that of Production Example 1.

The yield thereof was 93.1 g. A theoretical structure of the base oil 10 estimated from the feed is (A) $R^y$=CH(CH$_3$)CH$_2$, m=3, $R^z$=CH$_3$, (B) $R^x$=CH$_2$CH$_3$, (A)/(B) molar ratio (k/p)=1/14, k+p=15 (average value), and a calculated molecular weight of 1,242, from the formula (X). In addition, the carbon/oxygen molar ratio is 3.78.

Production Example 11

A 1-liter separable flask made of glass was fed with 60.5 g of isooctane, 60.6 g ($1.35 \times 10^{-1}$ mol) of polypropylene glycol monomethyl ether (having an average molecular weight of about 450), and 0.166 g of a boron trifluoride diethyl ether complex. Subsequently, 121.2 g (1.68 mol) of ethyl vinyl ether was added over 1 hour 20 minutes. After that, 177.6 g of a crude product was obtained by the same way as that of Production Example 1. The crude product had kinematic viscosities of 138.2 $mm^2/s$ at 40° C. and 15.61 $mm^2/s$ at 100° C.

Next, the autoclave containing the catalyst prepared in Catalyst Preparation Example 1 was opened and a liquid layer was then removed by decantation, followed by charging 300 g of isooctane and 100 g of the above-mentioned crude product. The autoclave was purged with nitrogen and then purged with hydrogen, followed by obtaining a base oil 11 by the same way as that of Production Example 1.

The yield thereof was 93.7 g. A theoretical structure of the base oil 11 estimated from the feed is (A) $R^y$=CH(CH$_3$)CH$_2$, m=7.2 (average value), $R^z$=CH$_3$, (B) $R^x$=CH$_2$CH$_3$, (A)/(B) molar ratio (k/p)=1/11.4, k+p=12.4 (average value), and a calculated molecular weight of 1,298, from the formula (X). In addition, the carbon/oxygen molar ratio is 3.58.

Production Example 12

A 1-liter separable flask made of glass was fed with 60.5 g of isooctane, 76.6 g ($1.20 \times 10^{-1}$ mol) of polypropylene glycol monomethyl ether (having an average molecular weight of about 640), and 0.148 g of a boron trifluoride diethyl ether complex. Subsequently, 108.2 g (1.50 mol) of ethyl vinyl ether was added over 1 hour and 10 minutes. After that, 180.7 g of a crude product was obtained by the same way as that of Production Example 1. The crude product had kinematic viscosities of 152.1 $mm^2/s$ at 40° C. and 18.36 $mm^2/s$ at 100° C.

Next, the autoclave containing the catalyst prepared in Catalyst Preparation Example 1 was opened and a liquid layer was then removed by decantation, followed by charging 300 g of isooctane and 100 g of the above-mentioned crude product. The autoclave was purged with nitrogen and then purged with hydrogen, followed by obtaining a base oil 12 by the same way as that of Production Example 1.

The yield thereof was 94.9 g. A theoretical structure of the base oil 12 estimated from the feed is (A) $R^y$=CH(CH$_3$)CH$_2$, m=10.5 (average value), $R^z$=CH$_3$, (B) $R^x$=CH$_2$CH$_3$, (A)/(B) molar ratio (k/p)=1/11.5, k+p=12.5 (average value), and a calculated molecular weight of 1,497, from the formula (X). In addition, the carbon/oxygen molar ratio is 3.50.

Production Example 13

A 1-liter separable flask made of glass was fed with 60.5 g of isooctane, 112.9 g ($1.23 \times 10^{-1}$ mol) of polypropylene glycol monomethyl ether (having an average molecular weight of about 915), and 0.148 g of a boron trifluoride diethyl ether complex. Subsequently, 72.1 g (100 mol) of ethyl vinyl ether was added over 50 minutes. After that, 178.6 g of a crude product was obtained by the same way as that of Production Example 1. The crude product had kinematic viscosities of 121.8 $mm^2/s$ at 40° C. and 18.54 $mm^2/s$ at 100° C.

Next, the autoclave containing the catalyst prepared in Catalyst Preparation Example 1 was opened and a liquid layer was then removed by decantation, followed by charging 300 g of isooctane and 100 g of the above-mentioned crude product. The autoclave was purged with nitrogen and then purged with hydrogen, followed by obtaining a base oil 13 by the same way as that of Production Example 1.

The yield thereof was 95.4 g. A theoretical structure of the base oil 13 estimated from the feed is (A) $R^y$=CH(CH$_3$)CH$_2$, m=15.0 (average value), $R^z$=CH$_3$, (B) $R^x$=CH$_2$CH$_3$, (A)/(B) molar ratio (k/p)=1/7.1, k+p=8.1 (average value), and a calculated molecular weight of 1,441, from the formula (X). In addition, the carbon/oxygen molar ratio is 3.31.

Production Example 14

A 1-liter separable flask made of glass was fed with 60.5 g of isooctane, 149.2 g ($1.19 \times 10^{-1}$ mol) of polypropylene glycol monomethyl ether (having an average molecular weight of about 1,250), and 0.148 g of a boron trifluoride diethyl ether complex. Subsequently, 36.1 g (0.50 mol) of ethyl vinyl ether was added over 50 minutes while the temperature of the reaction solution was kept at 25° C. After that, 179.4 g of a crude product was obtained by the same way as that of Production Example 1. The crude product had kinematic viscosities of 121.5 $mm^2/s$ at 40° C. and 20.88 $mm^2/s$ at 100° C.

Next, the autoclave containing the catalyst prepared in Catalyst Preparation Example 1 was opened and a liquid layer was then removed by decantation, followed by charging 300 g of isooctane and 100 g of the above-mentioned crude product. The autoclave was purged with nitrogen and then purged with hydrogen, followed by obtaining a base oil 14 by the same way as that of Production Example 1.

The yield thereof was 96.2 g. A theoretical structure of the base oil 14 estimated from the feed is (A) $R^y$=CH(CH$_3$)CH$_2$, m=21.0 (average value), $R^z$=CH$_3$, (B) $R^x$=CH$_2$CH$_3$, (A)/(B) molar ratio (k/p)=1/3.2, k+p=4.2 (average value), and a calculated molecular weight of 1,508, from the formula (X). In addition, the carbon/oxygen molar ratio is 3.13.

Production Example 15

A 1-liter separable flask made of glass was fed with 60.5 g of tetrahydrofuran, 25.5 g ($2.45 \times 10^{-1}$ mol) of neopentyl glycol, and 0.579 g of a boron trifluoride diethyl ether complex. Subsequently, 176.7 g (2.45 mol) of ethyl vinyl ether was added over 2 hours and 35 minutes. A reaction was exothermic, so a reaction solution was kept at 25° C. by placing the flask in an ice-water bath. After that, 50 ml of an aqueous solution of 5% by mass of sodium hydroxide was added to the reaction solution to terminate the reaction, followed by addition of 100 g of isooctane. Tetrahydrofuran, the reaction solvent, was removed using a rotary evaporator under reduced pressure. Subsequently, the reaction solution was transferred to a 1-liter separating funnel and a lower layer was then removed, followed by washing four times with 100 ml of distilled water. After that, the solvent and light components were removed using a rotary evaporator under reduced pressure, resulting in 155.8 g of a crude product. The crude product had kinematic viscosities of 95.17 $mm^2/s$ at 40° C. and 9.868 $mm^2/s$ at 100° C.

Next, the autoclave containing the catalyst prepared in Catalyst Preparation Example 1 was opened and a liquid layer was then removed by decantation, followed by charging 300 g of isooctane and 100 g of the above-mentioned crude product. The autoclave was purged with nitrogen and then purged with hydrogen, followed by obtaining a base oil 15 by the same way as that of Production Example 1.

The yield thereof was 88.9 g. A theoretical structure of the base oil 10 estimated from the feed is (A) $R^c$=$CH_2C(CH_3)_2CH_2$, $R^d$=$CHCH_2$, $R^e$=$R^5$=$R^6$=$R^7$=H, n=0, $R^9$=$CH_2CH_3$, a total of b in a molecule is 8 (average value), a=1, c=1, d=2, and a calculated molecular weight of 737, from the formulae (II) and (III).

In addition, the carbon/oxygen molar ratio is 4.10.

Production Example 16

A 1-liter separable flask made of glass was fed with 50.6 g of isooctane, 13.8 g ($3.00 \times 10^{-1}$ mol) of ethanol, and 0.355 g of a boron trifluoride diethyl ether complex. Subsequently, 216.3 g (3.00 mol) of ethyl vinyl ether was added over 3 hours. A reaction was exothermic, so a reaction solution was kept at 25° C. by placing the flask in an ice-water bath. After the addition of all monomers, the reaction solution was continuously stirred for additional 20 minutes and 19.6 g ($3.16 \times 10^{-1}$ mol) of ethylene glycol was then added and stirred for 5 minutes.

The solvent and ethanol formed by the reaction were distilled off using a rotary evaporator. After that, the reaction solution was added with 50 g of isooctane and then transferred to a 2-liter washing tank, in which it was washed with 200 ml of a 3% by mass aqueous solution of sodium hydroxide and then washed with 200 ml of distilled water six times, followed by removing the solvent and light components using a rotary evaporator under reduced pressure Consequently, 207.8 g of a crude product was obtained.

Next, the autoclave containing the catalyst prepared in Catalyst Preparation Example 1 was opened and a liquid layer was then removed by decantation, followed by charging 300 g of isooctane and 100 g of the above-mentioned crude product. The autoclave was purged with nitrogen and then purged with hydrogen, followed by increasing the temperature therein while the pressure of hydrogen was adjusted to 3.0 MPaG. After retaining the autoclave at 160° C. for 6 hours, the autoclave was cooled to room temperature. A decrease in hydrogen pressure was confirmed as the reaction proceeded while an increase in temperature allowed an increase in inner pressure of the autoclave. When the pressure of hydrogen decreases, hydrogen was suitably supplied, thereby keeping the inside of the autoclave at 3.0 MPaG. The autoclave was purged with nitrogen and then depressurized, followed by recovering a reaction solution and then removing the catalyst therefrom by filtration.

A filtrate was subjected to a rotary evaporator under reduced pressure to remove the solvent and light components. Consequently, 92.3 g of a polyvinyl ether crude product having a hydroxyl group on an end was obtained.

A 30-ml eggplant type flask was fed with 0.80 g of sodium hydride (oiliness, 60 to 72%) and an oil content was then removed by washing with hexane, followed by the addition of 73.8 g of the above-mentioned polyvinyl ether crude product having the hydroxyl group on the end. Upon the addition, evolution of bubbles was observed and sodium hydride was then dissolved. The solution was transferred to a 200-ml autoclave, 30 ml of triethylene glycol dimethyl ether and 23.2 g ($4.00 \times 10^{-1}$ mol) of propylene oxide were added thereto and the temperature thereof was then raised. It was kept at 110° C. for 8 hours, followed by cooling down to room temperature. A decrease in pressure was confirmed as the reaction proceeded while an increase in temperature allowed an increase in inner pressure of the autoclave.

A 300-ml eggplant type flask was fed with 5.20 g of sodium hydride (oiliness, 60 to 72%) and an oil content was then removed by washing with hexane, followed by the addition of 40 ml of triethylene glycol dimethyl ether and the above-mentioned polymerization solution. Upon the addition of the polymerization solution, evolution of bubbles was observed. Subsequently, 28.4 g ($2.00 \times 10^{-1}$ mol) of methyl iodide was added over 2 hours and 30 minutes. After completion of the addition of all of methyl iodide, the solution was continuously stirred for additional 3 hours. After that, a small amount of ethanol was added and the absence of evolution of bubbles was confirmed. Subsequently, the solution was added with 60 ml of isooctane and then transferred to a 500-ml separation funnel. After washing 10 times with 60 ml of pure water, the solvent was removed using the rotary evaporator under reduced pressure. Consequently, a base oil 16 was obtained. The yield thereof was 93.2 g. A standard theoretical structure of the base oil 16 estimated from the feed and the yield of the final product is represented by the following formula (XI) and a calculated molecular weight of 932. In addition, a carbon/oxygen molar ratio was 3.57.

[Chem 9]

(XI)

Examples 1 to 16 and Comparative Examples 1 and 2

For Examples 1 to 16, the base oils 1 to 16 obtained from Production Examples 1 to 16 were used, respectively. In contrast, for Comparative Example 1, commercially-available polyalkylene glycol (PAG oil) (manufactured by Idemitsu Kosan Co., Ltd., trade name: Daphne Hermetic Oil PS) was used. In addition, for Comparative Example 2, commercially-available polyalkylene glycol (PAG oil) (manufactured by Idemitsu Kosan Co., Ltd., trade name: Daphne Hermetic Oil PZ100S) was used.

For the base oils and the commercially available polyalkylene glycols, kinematic viscosities (at 40° C. and 100° C.), viscosity indexes, pour points, and compatibility were measured. The results thereof are listed in Tables 1 and 2.

The characteristics of the respective compounds were determined and evaluated by the following methods:

(1) Kinematic Viscosity

The kinematic viscosities of sample oil were measured at 100° C. and 40° C. on the basis of JIS K2283, respectively.

(2) Viscosity Index

From the obtained kinematic viscosities, a viscosity index was determined on the basis of JIS K2283.

(3) Pour Point

A pour point was measured on the basis of JIS K2269.

(4) Examination of Compatibility to Refrigerant

The refrigerant compatibility of each sample oil was evaluated on the basis of "Test Method for Compatibility to Refrigerant" in "Refrigerator Oil", JIS-K-2211 by using carbon dioxide as a refrigerant. To be specific, each sample oil was blended in a refrigerant so as to be in amounts of 10, 20, and 30% by mass, and a temperature was then gradually increased from −50° C. to 20° C., followed by measuring the temperature at which the sample had caused separation or had become opaque. In Table 1, "20<" indicates that there is no separation or opaqueness at 20° C.

TABLE 1

| | Lubricating oil | Kinematic viscosity mm²/s @40° C. | Kinematic viscosity mm²/s @100° C. | Viscosity index | Pour point (° C.) | Compatibility (° C.) 10% by mass oil | Compatibility (° C.) 20% by mass oil | Compatibility (° C.) 30% by mass oil |
|---|---|---|---|---|---|---|---|---|
| Example 1 | Base oil 1 | 65.27 | 8.758 | 107 | −40.0 | 11.2 | 17.1 | 17.1 |
| Example 2 | Base oil 2 | 73.17 | 9.352 | 104 | −37.5 | 8.6 | 13.5 | 20< |
| Example 3 | Base oil 3 | 69.91 | 9.351 | 111 | −40.0 | 5.5 | 9.6 | 20< |
| Example 4 | Base oil 4 | 71.51 | 9.433 | 109 | −40.0 | 5.2 | 10.6 | 20< |
| Example 5 | Base oil 5 | 69.99 | 11.47 | 158 | −47.5 | 4.0 | 8.8 | 20< |
| Example 6 | Base oil 6 | 61.16 | 8.955 | 123 | −40.0 | 0.2 | 5.7 | 20< |
| Example 7 | Base oil 7 | 75.09 | 10.46 | 124 | −45.0 | −7.0 | −8.0 | 20< |
| Example 8 | Base oil 8 | 58.52 | 9.359 | 141 | −47.5 | −11.8 | −5.0 | 6.7 |
| Example 9 | Base oil 9 | 71.75 | 10.92 | 142 | −42.5 | −24.5 | −10.1 | 20< |
| Example 15 | Base oil 15 | 92.81 | 10.37 | 92 | −32.5 | 4.2 | 11.9 | 20< |
| Example 16 | Base oil 16 | 71.43 | 9.513 | 111 | −37.5 | 5.6 | 10.2 | 20< |
| Comparative example 1 | Commercially available oil 1 | 47.49 | 10.41 | 215 | −52.5 | Separated | Separated | Separated |

TABLE 2

| | Lubricating oil | Kinematic viscosity mm²/s @40° C. | Kinematic viscosity mm²/s @100° C. | Viscosity index | Pour point (° C.) | Compatibility (° C.) 10% by mass oil | Compatibility (° C.) 20% by mass oil | Compatibility (° C.) 30% by mass oil |
|---|---|---|---|---|---|---|---|---|
| Example 10 | Base oil 10 | 234.6 | 20.10 | 99 | −27.5 | 6.0 | 20< | 20< |
| Example 11 | Base oil 11 | 135.9 | 16.29 | 128 | −37.5 | Separated | 20< | 20< |
| Example 12 | Base oil 12 | 151.6 | 19.10 | 143 | −35.0 | −50 | −50 | 20< |
| Example 13 | Base oil 13 | 118.5 | 18.54 | 176 | −45.0 | Separated | −49.0 | −40.3 |
| Example 14 | Base oil 14 | 96.17 | 17.10 | 194 | −42.5 | Separated | −50.0 | −50.0 |
| Comparative example 2 | Commercially available oil 2 | 104.9 | 20.10 | 217 | −42.5 | Separated | Separated | Separated |

Table 1 shows values of physical properties of base oils having kinetic viscosities of about 10 mm²/s at 100° C. among those in Examples and Comparative Examples. The base oils of Examples 1 to 9, 15, and 16 of the present invention have good compatibilities, respectively, compared with PAG oil of Comparative Example 1. Those base oils of the present invention are particularly suitable for lubricating oil for car air conditioners.

Table 2 shows values of physical properties of base oils having kinetic viscosities of about 20 mm²/s at 100° C. among those in Examples and Comparative Examples. The base oils of Examples 10 to 14 of the present invention have good compatibilities, respectively, compared with PAG oil of Comparative Example 2. Those base oils of the present invention are particularly suitable for lubricating oil for showcases, vending machines, and water heaters.

INDUSTRIAL APPLICABILITY

The lubricating oil of the present invention is excellent in compatibility to a natural refrigerant as a refrigerant as well as excellent in lubrication property, so it can be used as lubricating oil for a compression refrigerator for a natural refrigerant. In addition, the lubricating oil of the present invention can be also utilized as lubricating oil for a compression refrigerator for a mixture refrigerant of a natural refrigerant such as carbon dioxide.

Further, for improving the compatibility to a refrigerant, it can be used in mixture with other lubricating oil for a compression refrigerator, such as an ester compound, a polycarbonate compound, mineral oil, alkyl benzene, or polyalphaolefin.

Further, the refrigeration unit of the present invention employs a natural refrigerant and the lubricating oil of the present invention, so it can be effectively employed in a refrigeration system as a compression refrigerator, an air-conditioning system, a car air-conditioner system, a showcase, a water heater, a vending machine, a compressor-type compression refrigerator such as a refrigerator, or the like.

The invention claimed is:

1. A lubricating oil, comprising a polyvinyl ether compound containing an alkylene glycol or polyoxyalkylene glycol unit and a vinyl ether unit in a molecule and having a molecular weight in a range of 300 to 3,000, wherein said polyvinyl ether compound is a compound of formula (I):

wherein $R^1$, $R^2$, and $R^3$ each represent a hydrogen atom or a hydrocarbon group having 1 to 8 carbon atoms, which may be identical to or different from one another; $R^b$ represents a divalent hydrocarbon group having 2 to 4 carbon atoms; $R^a$ represents a hydrogen atom, an aliphatic or alicyclic hydrocarbon group having 1 to 20 carbon atoms, an aromatic group which has 1 to 20 carbon atoms and may have a substituent, an acyl group having 2 to 20 carbon atoms, or an oxygen-containing hydrocarbon group having 2 to 50 carbon atoms; $R^4$ represents a hydrocarbon group having 1 to 10 carbon atoms; when there are two or more of each of $R^a$, $R^b$, and $R^4$, they may be identical to or different from one another; m represents an average value of 2 to 50; k represents an average value of 1 to 50; p represents an average value of 2 to 25; when k and p each represent 2 or more, constitutional units may be in block or in random; and when there are two or more of $R^bO$, they may be identical to or different from one another; and wherein the polyvinyl ether compound has a carbon/oxygen molar ratio of 4.0 or less.

2. The lubricating oil for a compression refrigerator according to claim 1, comprising a polyvinyl ether compound which has a molecular weight in the range of 300 to 3,000 and is obtained by polymerizing vinyl ether compounds in the presence of a polymerization initiator, characterized in that at least one of the polymerization initiator and the vinyl ether compound contains an alkylene glycol residue or a polyoxyalkylene glycol residue.

3. The lubricating oil according to claim 1, wherein m is 2 to 20.

4. The lubricating oil according to claim 1, wherein the polyvinyl ether compound has a carbon/oxygen molar ratio ranges from 2.50 to 4.0.

5. The lubricating oil according to claim 1, wherein the lubricating oil has a kinetic viscosity at 100° C. is in the range of 1 to 50 mm$^2$/s.

6. The lubricating oil according to claim 1, wherein the lubricating oil has a viscosity index is 80 or more.

7. The lubricating oil according to claim 1, wherein the polyvinyl ether compound has a carbon/oxygen molar ratio ranges from 3.50 to 4.0.

8. The lubricating oil according to claim 1, wherein the lubricating oil has a kinetic viscosity at 100° C. is in the range of 5 to 20 mm$^2$/s.

9. The lubricating oil according to claim 1, wherein the lubricating oil has a viscosity index is at least 100.

10. The lubricating oil according to claim 1, wherein the lubricating oil has a viscosity index is at least 120.

11. The lubricating oil according to claim 1, wherein m is 2 to 10.

12. The lubricating oil according to claim 1, wherein m is 2 to 5.

13. The lubricating oil according to claim 1, wherein k is 1 to 10.

14. The lubricating oil according to claim 1, wherein k is 1 to 2.

15. The lubricating oil according to claim 1, wherein p is 5 to 15.

16. A refrigeration unit, comprising:
   a compression refrigerator for a natural refrigerant, which includes at least a compressor, a condenser, an expansion mechanism, and an evaporator;
   at least one natural refrigerant selected from the group consisting of a carbon dioxide refrigerant, an ammonia refrigerant, and a hydrocarbon refrigerant; and
   the lubricating oil according to claim 1.

17. The refrigeration unit according to claim 16, wherein the natural refrigerant is a carbon dioxide refrigerant.

* * * * *